Sept. 24, 1929.  A. C. CARLSON  1,728,925
RUNNING GEAR FOR TOY WAGONS
Filed March 29, 1926
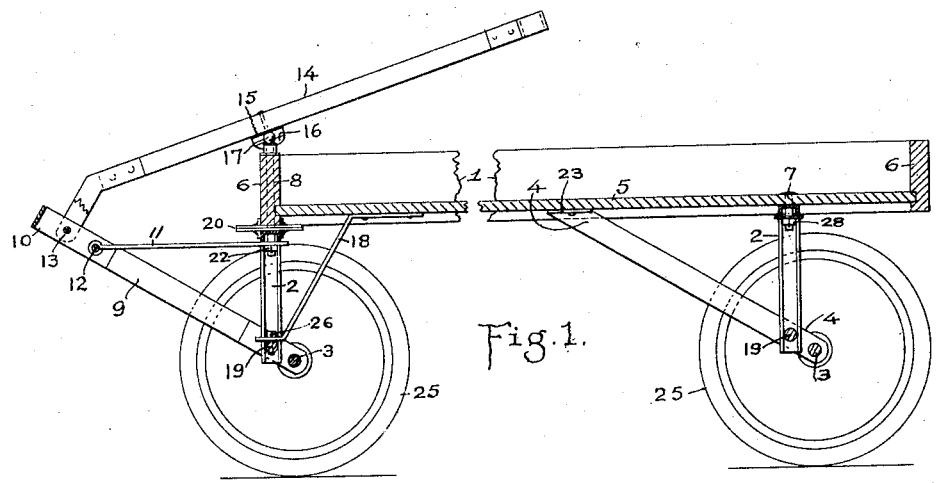

Patented Sept. 24, 1929

1,728,925

UNITED STATES PATENT OFFICE

ARTIE C. CARLSON, OF VALPARAISO, INDIANA, ASSIGNOR, BY MESNE ASSIGNMENTS, TO THE NORTHERN TRUST COMPANY AND HAROLD H. ROCKWELL, AS TRUSTEES

RUNNING GEAR FOR TOY WAGONS

Application filed March 29, 1926. Serial No. 98,302.

My invention relates to improvements in running gears for toy wagons, and it more especially consists of the features pointed out in the claims.

The purpose of my invention is to provide a simple running gear that in the main is the same for both front and rear axles; that is adaptable to any desired style of body; that on account of the ruggedness of the parts and the rigidity of their assemblage makes the running gear equally adaptable for light weight services or heavy duty purposes; that supports the body weight in advance of both front and rear axles that has disconnected steering pivots; and that provides a beveled guiding plate on the steering handle for quickly locating and efficiently holding the steering handle on the king pin.

With these and other ends in view, I illustrate in the accompanying drawing such instances of adaptation as will disclose the broad underlying features without limiting myself to the specific details shown thereon and described herein.

Figure 1 is a side elevation, partly in section.

Fig. 2 is a front elevation, partly in section, with the wheels omitted.

Fig. 3 is a diagrammatic plan view, showing the wheels omitted.

Fig. 4 is an enlarged elevation partly in section of the steering handle—king pin assembly.

Fig. 5 is a plan view of a formed fifth wheel plate.

Fig. 6 is an enlarged elevation partly in section of the upper steering pivot assembly.

Fig. 7 is an enlarged elevation of the lower steering pivot assembly, partly in section.

Fig. 8 is an elevation partly in section of a body support and its attachment to the axle bearing members.

Fig. 9 is an enlarged elevation, partly in section, of the fastening for the rear body support.

In practically carrying out my invention, I may use alternative forms of materials which vary in their cross sectional shapes, etc., as the exigencies of different conditions of use may demand.

Any desired form of body 1 may be used. It comprises front and rear ends 6 which may be joined by suitable sides and a floor 5. Body supports 2 of channel shape in cross section may be bent up, as shown in Fig. 2, to form duplicate members that are equally serviceable for both the front and rear ends of the body. These supports at their lower ends are held in rigid spaced apart relation by cross rods 19 which have shoulders 24 at their ends. For the rear axle a support 2 is riveted to the axle bearing members 4 which carry the rear axle 3. At the front end of the body the member 2 at its lower ends is rigidly connected to a cross rod 19 that is similarly shouldered at 24 and rigidly riveted to the sides 9 of the steering fork which in this case support the front axle 3.

As stated, the supports 2 are duplicates of each other, both being provided with a hole through the transverse portion which, at the rear end of the wagon, serves to receive the body securing bolt 7, and at the front end of the body a similar hole receives the king pin or upper steering pivot 8. The rear end axle bearing members 4 at their free ends have ears 23 formed thereon (Fig. 3), by means of which they may be secured to the under side of the body or alongside of the body, if desired. Wheels 25 are held free to rotate on the outer ends of the axles 3 in any desired manner.

The steering of my improved running gear is effected by means of the steering handle 14 which is pivoted for vertical movement on the steering fork 10 at 13. From Fig. 3 it will be seen that the sides 9 of the steering fork 10 are bent toward the center forming a loop at the front extremity of the steering fork. Between the sides of this loop a steering fork brace 11 is positioned. It is secured at its front end to the steering fork 10 by a bolt 12, and at its rear end the king pin 8 passes through the brace 11 as it rests against the under side of the support 2, where a nut 22 holds the parts assembled. The king pin at its upper end has an enlarged diameter head 17 that terminates in a knob, on which the steering handle positioning plate 15 rests. This plate has beveled sides 16 which serve to quickly bring the steering lever into pivotal relation with the knob of the head 17. The plate 15 serves to hold the steering handle 14 in pivotal relation to the upper steering pivot or king pin 8 while the wagon is being steered. Fifth wheel plates 20 are placed between the body and the front support 2, the upper one of these plates is held on the front end of the body against turning by pressed up ears 21 and the lower plate is similarly held on the upper side of the support 2. The king pin 8 passes through these plates and they serve to receive the frictional wear between the pivoting front axle and the body as the wagon is steered in different directions.

The front or steering portion of the wagon has a body brace 18 secured at one end to the under side of the body and at the other end in pivotal relation on the cross rod 19 by means of pivot pin 26 which is in axial alignment with the king pin 8.

It will be seen that my improved construction lends itself admirably to parcels post shipment for the reason that by simply disconnecting the bolt 7, its nut 28 and washer 27 at the rear end, the king pin 8 at the front end, the body brace 18 and the rear axle bearing members 4, everything can be easily packed flat in a carton along with the wheels and the body. At their destination the entire wagon is easily assembled by anyone without the necessity of skilled assistance.

By making so many of the running gear parts in duplicate a great saving is effected in the cost of manufacture, and a great simplification in assembling the different parts is also secured.

What I claim is:

1. In toy wagon running gears, duplicate front and rear end body supports bent into U-shape, cross rods for holding the free ends of the supports spaced apart, and axle bearing members riveted to the ends of the cross rods.

2. In toy wagon running gears, a suitable body, a pair of axles, a pair of bearing members for one axle secured to the body, a separate pair attached to a steering lever, a pair of cross rods each one of which is secured to each pair of bearing members, a pair of duplicate body supports attached to the cross rods, such structure constituting two separate units, means for rigidly securing one unit to one end of the body, and means for pivotally attaching the other unit to the other end of the body.

3. In toy wagon running gears, a suitable body, a front axle assembly, means for pivoting the same to the body for horizontal movement, such means constituting a fixed king pin which terminates above the front end of the body, a steering handle connected to the front axle assembly for movement in a vertical direction, a king pin bearing plate on the under side of the steering handle, and side walls to said plate adapted to engage the upper end of the king pin, said side walls terminating at an angle to each other to thereby readily guide the steering handle into position on the king pin.

4. In toy wagon running gears, a suitable body, a front wheel assembly comprising a body support, a steering fork attached thereto, a cross rod joining the support and the steering fork, an axle in the lower ends of the steering fork, a steering handle pivoted to the steering fork, a body brace pivotally secured to the cross rod, a steering fork brace pivotally secured to the body support, and means for pivoting the steering fork brace and body support to the body in alignment with the pivotal connection of the body brace to the cross rod.

5. In toy wagon running gears, a suitable body, a pair of axles, separate axle bearing members on the axles, separate cross rods each rod being attached to a pair of bearing members in approximate parallel relation to the axles, and duplicate body supports separately attached to the cross rods, one pair of axle bearing members being attached to a steering handle and the other pair attached to the body serving as braces.

In testimony whereof I affix my signature.

ARTIE C. CARLSON.